United States Patent [19]

Suganuma et al.

[11] Patent Number: 4,524,046
[45] Date of Patent: Jun. 18, 1985

[54] METHOD FOR MANUFACTURING A CAM-CAM SHAFT ASSEMBLY

[75] Inventors: Tetsuya Suganuma, Nagoya; Koji Kazuoka, Toyota; Shuichi Fujita, Toyota; Yoshitaka Takahashi, Toyota; Katsuhiko Ueda, Aichi; Hitoshi Nakamura, Toyota, all of Japan

[73] Assignee: Toyota Jidosha Kabushiki Kaisha, Toyota, Japan

[21] Appl. No.: 599,605

[22] Filed: Apr. 16, 1984

Related U.S. Application Data

[63] Continuation of Ser. No. 393,673, Jun. 30, 1982.

[30] Foreign Application Priority Data

Jul. 1, 1981 [JP] Japan .................. 56-102446

[51] Int. Cl.³ .................. B22F 5/00; B22F 7/08
[52] U.S. Cl. .................. 419/8; 419/47
[58] Field of Search .................. 419/5, 6, 8, 47

[56] References Cited

U.S. PATENT DOCUMENTS

| | | | |
|---|---|---|---|
| 3,962,772 | 6/1976 | Haller | 419/8 |
| 4,195,764 | 4/1980 | Bogart | 419/8 |
| 4,236,923 | 12/1980 | Takahashi et al. | 419/6 |

OTHER PUBLICATIONS

Hirschhorn, *Introduction to Powder Metallurgy*, (1969), APMI, New York, N.N, pp. 206-216.

*Primary Examiner*—Ben R. Padgett
*Assistant Examiner*—Matthew A. Thexton
*Attorney, Agent, or Firm*—Oblon, Fisher Spivak, McClelland & Maier

[57] ABSTRACT

A method for manufacturing a firm and rigid cam-cam shaft assembly, which comprises the steps: (a) molding a component having through-hole therein from a material of an alloy to be sintered, said material allowing the first ratio of the contraction of the inner diameter of the component at joining portion when the component is singly sintered to the inner diameter thereof before sintering to be more than 2%; (b) presintering said component; (c) assembling said component onto a metal shaft such that said metal shaft may be inserted into said through-hole; and (d) sintering said component assembled onto the metal shaft, whereby the joining of the component to the metal shaft is carried out in such a manner that the second ratio of the difference between the outer diameter of the metal shaft and the inner diameter of the contracted component after sintering to the outer diameter of the metal shaft is more than 2%.

12 Claims, 8 Drawing Figures

METHOD FOR MANUFACTURING A CAM-CAM SHAFT ASSEMBLY

This application is a continuation of application Ser. No. 393,673, filed June 30, 1982.

BACKGROUND OF THE INVENTION

(1) Field of the Invention

The present invention relates to a method for manufacturing a cam-cam shaft assembly in which a cam piece made of a specified wear-resistant sintered alloy is jointed to a cam shaft of a steel pipe or the like.

(2) Background of the Invention

As the cam-cam shaft assembly for use in the internal combustion engines, ones in which a cam and a cam shaft are integrally cast commonly using a ordinary cast iron, or chilled cast casting of an alloyed cast iron have been employed. Further, recently taking into account the improvement in engine performance, reduction in weight and cost, and so forth, a special sintered alloy has beem employed as a cam portion of a sliding face. A cam-cam shaft assembly which is constituted by assembling a component like a cam piece, a journal piece or the like onto a pipe-like steel shaft or the like has been proposed.

However, the cam shaft and the cam in the conventional cam-cam shaft assemblies have frequently been joined together by means of a secondary method such as brazing, welding, mechanical caulking or the like. Such conventional methods inevitably require a special machine or device for this purpose. In addition, since the number of components to be assembled onto the shaft is relatively large, troublesome joining steps can not be avoided.

For the purpose of eliminating such defects encountered in the conventional cam-cam shaft assemblies, there have been proposed the diffusion joining method in which a cam, a journal piece or the like which is made of a specified sintered alloy producing a liquid phase during sintering is metallurgically joined to a steel pipe shaft. According to this method, a component, such as a cam piece, made of the above specified alloy is presintered, and this presintered component is assembled onto the shaft by press-in method or by clearance-caulking method; and then the presintered component as assembled is sintered under a predetermined conditions to change it to a wear-resistant component such as a cam and at the same time effect the metallic bonding of the presintered component to the shaft member. Therefore, the method as just mentioned above is advantageous from the standpoint of the simplification of the manufacturing procedures, the cost reduction and so forth.

However, since many of the sintered alloys contracts or expands when heated during the sintering step, the inner diameter of the component such as a cam piece become larger and therefore, a firm and rigid joint between the component and the shaft can not necessarily be obtained. In addition to the requirement for the firm joining, such alloy for the component further requires wear resistance and therefore, a specified sintered alloy had to be discovered for this purpose.

In accordance with another method as previously proposed, there is employed a wear resistant iron-base sintered alloy comprising iron containing appropriate proportions of carbon, molybdenum, phosphorus, boron, and optionally copper and/or cobalt etc. which is capable of producing a liquid phase during sintering. However, the presintered cam piece made of such a wear resistant iron-base alloy as assembled onto the shaft is so joined to the shaft that during the course of sintering, the inner diameter of the cam piece expands by as much as slightly larger than 1% thereof and finally contracts as much as slightly larger than 1%. Thus, there remain the problems that the locating of the sintered component onto the pipe shaft is not necessarily attained with accuracy and that the joining strength becomes insufficient due to a small amount of the contraction. Therefore, reliability of the joining is not necessary satisfactory.

In case that the assembling interference, that is, the inner diameter of the cam piece with respect to the outer diameter of the cam shaft is designed smaller so as to compensate a small amount of the contraction, no expected effects can be obtained during the press-in procedure and/or during the succeeding procedures because the presintered mass has a small mechanical strength.

SUMMARY OF THE INVENTION

An object of the present invention is to provide a method for manufacturing a cam-cam shaft assembly which is free from the disadvantages encountered in the conventional methods.

Another object of the present invention is to provide a method for manufacturing a cam-cam shaft assembly which enables the simplification of the manufacturing procedure and the low cost production.

More specifically, the object of the present invention is to provide a method for firmly and rigidly joining a component such as cam, journal or the like onto a metal shaft with selecting an appropriate apparent interference of the component with respect to the metal shaft through interference fitting and liquid-phase diffusion joining by the use of a material which produce a liquid phase and contrasts to a large extent during sintering.

According to the method of the present invention, a component such as cam piece, a journal or the like is prepared by presintering a molded product made of such a material that the interference of the component is more than 2% after sintering as compared with the original diameter thereof before sintering; the presintered component is assembled onto a metal shaft made of steel pipe or the like; and that the presintered component as assembled is so sintered to be joined to the shaft that the ratio of the difference between the outer diameter of the metal shaft and the inner diameter of the sintered component to the outer diameter of the metal shaft (apparent interference) may be more than 2%.

BRIEF DESCRIPTION OF THE FIGURES

These and other object and advantages of the present invention will become apparent with the reading of the description of the invention in conjunction with the attached drawing in which.

DETAILED DESCRIPTION OF THE PRESENT INVENTION

Figure 1:
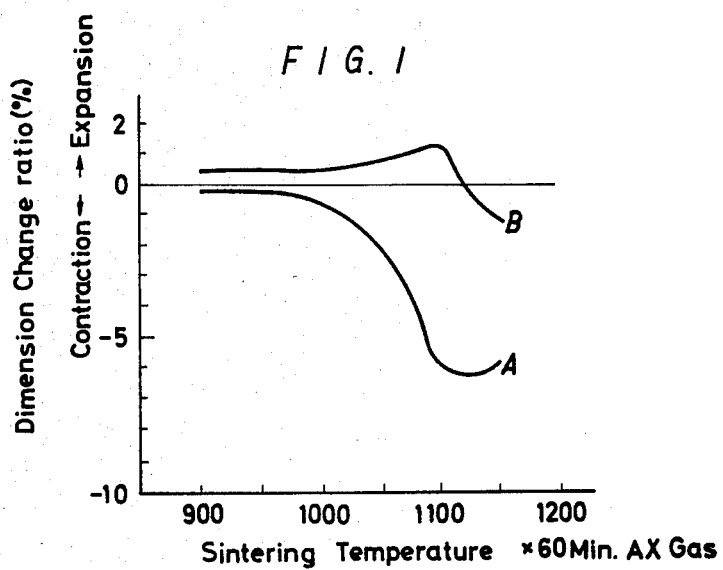
FIG. 1 is a diagram illustrating sintering curves (dimension contraction ratio) with respect to the sintered alloys in Example 1 and Control 1.

According to the present invention, the firm and rigid joint between a component such as a cam piece, a journal or the like and a metal shaft is attained through interference fitting and liquid-phase joining by use of a material as the component which produces a liquid phase and contracts to an extremely large extent during sintering.

The component is made of such a material that the ratio of the difference between the outer diameter of the metal shaft and the inner diameter of the component measured when sintered separately to the outer diameter of the metal shaft is more than 2%, preferably more than 3% and more preferably more than 4%. As regards the apparent interference, its ratio is preferably more than 3% and more preferably more than 4%. The term "apparent interference" used in this application means the ratio of the difference between the outer diameter of the metal shaft and the inner diameter of the component as sintered in the state of being not assembled onto the shaft to the outer diameter of the shaft.

An alloy to be sintered which is usable in the present invention preferably comprises from 2.5 to 7.5 wt. % of Cr, from 0.1 to 3.0 wt. % of Mn, from 0.2 to 0.8 wt. % of P, from 1.0 to 5.0 wt. % of Cu, from 0.5 to 2.0 wt. % of Si, less than 3 wt. % of Mo, from 1.5 to 3.5 wt. % of C, and the balance being Fe with less than 2% of impurities. The sintered alloy with the composition as mentioned above has the density of more than 7.3 g/cm$^3$, the apparent hardness Hv (10 kg) from 350 to 800, uniform distribution in the matrix of M$_3$C carbides of mean particle size of about from 5 to 30$\mu$ and/or a hardened steadite layer such that they constitute about from 5 to 30% matrix area.

The presintered alloy in the present invention is obtained as follows:

First, an alloy powder having the above-mentioned composition except carbon is prepared. Then, a predetermined amount of carbon is added to the alloy powder thus prepared, and then a molded powder product (compressed powder product) is obtained therefrom. Then, the molded product is presintered at a pre-determined temperature in accordance with powder metallurgy method to produce the presintered alloy product.

As the sintered alloy in the present invention may be also employed a high-density high-hardness iron base sintered alloy which comprises from 15 to 25 wt. % of Cr, from 0 to 3 wt. % of Mo, from 1 to 5 wt. % of Cu, from 0.3 to 0.8 wt. % of P, from 2.0 to 4.0 wt. % of C, the balance being Fe with less than 2 wt. % of impurities as contained in the ordinary iron base alloy, and has the density of more than 7.3 g/cm$^3$ and the Vickers hardness Hv from 400 to 700. In this sintered alloy, extremely hard fine carbide particles of (Fe, Cr)$_7$C$_3$ or (Fe, Cr, Mo)$_7$C$_3$ are uniformly distributed in the hard Fe-Cr-(Mo)-Cu-P-C type ($\alpha$-phase+$\gamma$phase) matrix. Such a sintered alloy can be obtained with the high density and hardness as referred to above according to almost the same method as in the case of the production of the ordinary iron base sintered alloy. The sintered alloys in the present invention exhibit good resistance in the wearing test.

The reasons for the limitation on the contents of the elements of the sintered alloy in the present invention as described first are as follows:

A part of chrome is solid-solved in the matrix and strengthens the matrix by forming a martensite or a bainite in the cooling process following the sintering, while the balance of it combines with carbon to form hardened carbide particles of M$_3$C type with (Fe.Cr)$_3$C as the main component, thereby enhancing the anti-wear, anti-scuffing and anti-seizure properties of the sintered alloy. If the addition of chrome is less than 2.5 wt. %, it will undesirably result in insufficient formation of carbide and concentration of carbide like a network on the crystalline boundary, thereby coarsening the structure and vastly deteriorating the slidability. If the addition of it exceeds 7.5 wt. %, it will undesirably result in excess amount of carbide after sintering, a change of crystal structure from M$_3$C type to M$_7$C$_3$ type and virtual disappearance of the phosphorus compound phase of steadite with the result of the sintered alloy being quite different in quality, thereby changing the slidability and even increasing the attack on a piece to be coupled.

The effect of Mn addition on the activation of Fe matrix for sintering is found prominent in the range of from 2.5 to 7.5 wt. % addition of Cr.

When the liquid phase generated in the sintering process of the alloy is utilized to join the alloy to another piece of, say, steel in contact, too much chrome exceeding the upper limit in the alloy will result in insufficiency of the liquid phase, thereby lowering the joint strength. On the contrary, if added volume of chrome is further increased, the machinability will decline; moreover, applicability of lubrite layer to improve the initial fit will become poor, which will lead to a cost up. Thus the chrome addition is limited to from 2.5 to 7.5 wt. %. The optimum range in all respects will be from 4.5 to 6.5 wt. %.

Manganese plays a highly significant role in the present invention with the following three effects. First, it is solid-solved in the matrix and strengthens the matrix; further it remarkably improves the hardenability of the alloy; it hardens in a slow-cooling process of 10° C./min in the common continuous sintering furnace of decomposed ammonia gas, easily attaining an apparent Hv (10 kg) of over 350 and thereby improving the slidability.

Second, Mn activates the Fe matrix for sintering and thereby enables a sintering at lower temperatures with an effect of energy costdown. As mentioned above, the effect is prominent when the addition is in the range of from 2.5 to 7.5 wt. %.

Third, Mn suppresses the crystal growth, refines the carbide and contributes to spheroidization, thereby improving the slidability of the sintered alloy.

In case the component is made of this alloy, it can be worked and then assembled after the presintering in AX gas atomsphere at from 900° to 1000° C. The addition of manganese is much effective in enhancing the strength of the presintered product. However, such an effect of enhancing the strength of the presintered product is virtually non-existent at addition of less than 0.10%, and an addition exceeding 3.0% will spheroidize and harden the atomised alloy powder, resulting not only in a heavy drop in the compressibility and moldability of the powder—which makes it impossible to obtain a desired density or hardness—but also in an increase of residual austenite in time of sintering and a drop in the hardness or liability of the sinterability being lowered through oxidization. Thus the addition of Mn is limited to from 0.10 to 3.0 wt. %, preferably from 0.10 to 1.5 wt. % when considered from wide aspects.

Phosphorus contributes to the sintered alloy in that it activates the sintering by being solid-solved into the matrix in time of sintering, with effects of not only enabling a sintering at lower temperatures but also giving higher density through the liquid phase by forming a low melting-point steadite phase. As mentioned above, especially the steadite phase contributes to the enhancement in wear resistance when the contents of Cr is from 2.5 to 7.5 wt. %. The steadite phase almost disappears and scarcely contributes to the wear resistance if the Cr content exceeds 7.5 wt. %. The effect of phosphorus will be unsatisfactory when its addition is less than 0.2 wt. %. On the other hand, when its addition exceeds 0.8%, the liquid phase will become excessive, resulting in abnormal growth of carbide and steadite and embrittlement of the crystalline boundary, which lowers the slidability. Thus the addition of phosphorus is limited to from 0.2 to 0.8 wt. %, preferably from 0.35 to 0.65 wt. %.

Molybdenum just like chrome not only increases the hardness of sintered mass by strengthening the matrix and enhancing the hardenability but also improves the slidability by forming a hardened compound carbide with $(Fe.Cr.Mo)_3C$ as the main component. Even without addition of Mo, the necessary performance of slidable parts such as a cam may be secured, but Mo addition of less than about 3 wt. % will be useful, because it has an effect of making the carbide more spheroidal and suppressing the aggressiveness of the alloy to the coupled piece. Thus, the addition is limited to less than 3 wt. %, preferably from 0.5 to 1.5 wt. %, because addition exceeding 3 wt. % would cause a network formation of carbide at the crystalline boundary, thereby embrittling the alloy, lowering the slidability and leading to a cost up.

Copper, being solid-solved in the matrix, stabilizes the sintering, increases the strength and hardness of the matrix, refines the carbide and contributes to a spherodization of the latter. When the addition of copper is less than 1.0 wt. %, these effects will not emerge; when it is too much the crystalline boundary will be weakened, resulting not only in a lowered slidability but also in a cost up. Thus the addition is limited to from 1.0 to 5.0 wt. %, preferably from 1.5 to 3.0 wt. %.

Silicon, being solid-solved in the matrix, stabilizes the sintering of the Fe matrix. Particularly in presence of from 2.5 to 7.5 wt. % chrome, it is effective for suppressing a scatter of density or hardnesss due to a variance of carbon content and equally effective for spheroidization of carbide particles. Meanwhile silicon is necessary as an essential deoxidizer of the molten metal when it is atomised to make an alloy powder. Too little addition of it, however, will accelerate the oxidization of powder, resulting in a loss of the deoxidized effect, while too much addition of it will not only lower the hardenability of the matrix, resulting in a decline of the hardness, but also coarsen the carbide and cause its segregation on the crystalline boundary, resulting in a lower slidability. Thus the addition is limited to from 0.5 to 2 wt. %, preferably from 0.7 to 1.5 wt. %.

Graphite to be used as carbon source, being solid-solved in the matrix, increases the hardness and strengthens the matrix; moreover, it improves the wear resistance by forming, together with chrome and molybdenum, such compound carbides as $(Fe.Cr)_3C$ or $(Fe.Cr.Mo)_3C$ and contributing to the formation of steadite phase ($Fe-Fe_3C-Fe_3P$).

Too little addition of it, however, will cause insufficiency in the hardness of the matrix and in the volumes of carbide and steadite, while too much of it will cause a coarsening of the structure and a network growth of the steadite at the crystalline boundary, thereby substantially deteriorating the slidability and heavily attacking the coupled piece. Thus the addition is limited to from 1.5 to 4.0 wt. %, preferably from 1.8 to 3.0 wt. %.

Except carbon, the elements in the alloy is preferably in a form of alloy powder of iron. The alloy powder, which is the material of the sintered alloy, is usually obtained from a molten metal by the atomising method.

The material alloy powder should desirably contain as the impurities: oxygen less than 0.5 wt. %, preferably less than 0.3 wt. %; and carbon less than 0.3 wt. %, preferably less than 0.1 wt. %.

According to the atomising method, the molten alloy materials prepared after mixing the powders of the alloy materials together may be atomised from the upper side to produce the atomized metal while the jet water stream is blown against the dropping molten metal from the side in the $N_2$ atmosphere. The particle size of the atomised alloy powder is passably less than 80 mesh, preferably less than 100 mesh and less than 350 mesh which constitutes less than 40% of the total volume.

The contents of the impurities as well as the mesh of the alloy powder influence mainly upon the compressivity and moldability at the time of powder molding, as well as upon the characteristics and part performance of the sintered mass.

The atomised alloy powder thus obtained is added with carbon, usually graphite, preferably scaly graphite for powder metallurgy. Usually graphite of up to about 10 μm in mean particle diameter is employed, but fine particles of less than 2–3μ would be preferable. These elements may be blended by the routine procedure but a specific matrix blending method, a depressurized blending method or a vibration-mill method can be adopted. These methods will minimize the segregation of graphite in the blending and molding processes, thereby making the matrix hardness, the shape, size and distribution of carbides in different parts of the product uniform and giving desirable results with less variances in the anti-wear, anti-scuffing and anti-pitting properties of the product.

The material thus prepared is molded, sintered and then cooled. The molding is done to a desired shape usually under a pressure of about 5–about 7 $t/cm^2$, preferably about 5.5–about 6.5 $t/cm^2$. The density of the molded product is passably about 5.8–about 6.4 $g/cm^3$, preferably about 5.9–about 6.3 $g/cm^3$. The compressed powder is next sintered at a temperature in the range of about 1020° C.–about 1180° C., preferably about 1050° C.–about 1150° C. The sintering time depends on the temperature. The sintering is performed usually for about 30 or about 90 minutes. It is desirable that the sintering be done in a gas such as hydrogen, nitrogen, hydrogen-nitrogen mixed gas, or decomposed ammonia, or in vacuum. The dew point of the atmosphere used is desirably less than −10° C., more desirably less than −20° C.

The sintered mass thus yielded acquires the necessary hardness through a cooling to about 600° C. at a rate of about 10° C./min, preferably 20°–100° C./min.

The presintering is done at a temperature ordinarily set for this purpose.

As the shaft member onto which the presintered mass is assembled, a steel pipe, a solid steel bar as commonly employed for this purpose are used. As a matter of course, a member which loses its strength at the sintering temperature can not be employed.

Now, the present invention will be explained more specifically referring to Examples and Control as given below. The examples are merely illustrative of the present invention and not intended to limit the scope of the invention.

EXAMPLE 1

Figure 2:
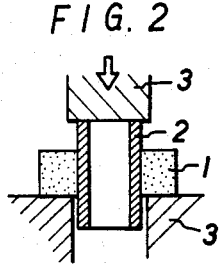
FIG. 2 is a sectional view illustrating a method of measuring joint strengths.

An alloy having the composition of Fe-5 wt. % Cr-1 wt. % Si-0.5 wt. % Mn-0.5 wt. % P-2.5 wt. % C (Material "A") was employed as a specific wear resistant sintered alloy. A presintered alloy with 50 mm in outer diameter, $(28+\alpha)$ mm in inner diameter and 15 mm in thickness was obtained by using powdered material of the alloy. The presintered product was assembled onto a steel pipe with 28 mm in outer diameter, 20 mm in inner diameter and 30 mm in length which was made of the material corresponding to S45. Thereafter, sintering was carried out to produce a joined assembly as test piece. Setting the clearance of the inner diameter of the presintered product at 0, 0.3, 0.6, 0.8, 1.0 mm, a plurality of the joined assemblies as test piece were obtained. As shown in FIG. 2, the shearing strength was measured as for each test piece by pushing the steel pipe 2 downward by means of a pressurizing jig while the sintered mass was placed on a support having a hole therein.

Figure 3:
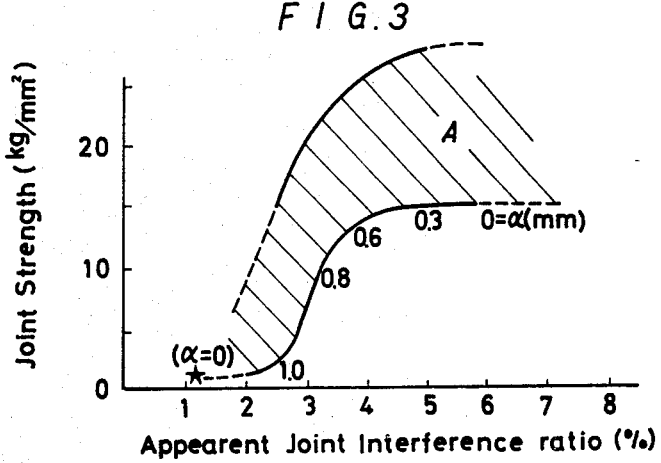
FIG. 3 is a diagram illustrating the relationship between the contraction ratio of the sintered alloys and the joint strength.
Figure 4:
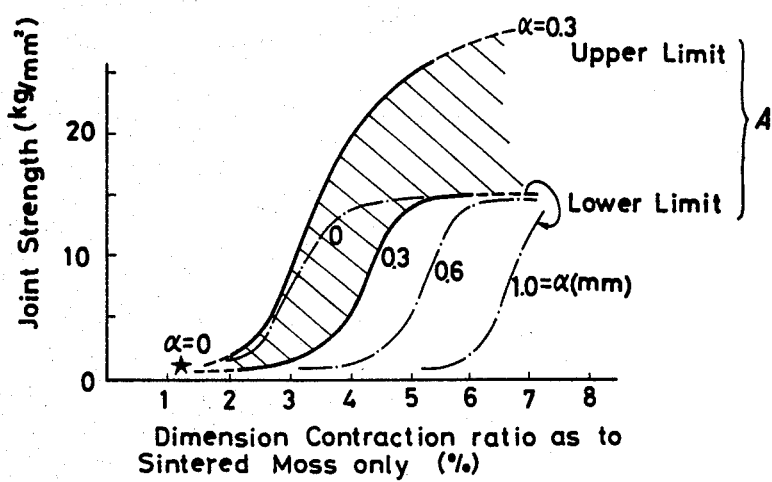
FIG. 4 is a diagram illustrating the relationship between an apparent interference of a sintered alloy component with respect to a member onto which the component is to be joined and the joint strength.

Using presintered products as not being assembled onto the steel pipe, the dimension change ratios (contraction ratios) of the sintered alloy were measured. The sintering was done at given temperatures in the AX gas for 60 minutes while heating. The results of the dimension change ratios thus measured are shown by the curve "A" in FIG. 1. The measured values of the shearing strength are shown in FIGS. 3 and 4 and in Table 1. Each value is the mean one from 10 test pieces as measured.

CONTROL

Using a sintered alloy having the composition of Fe-8 wt. % Mo-5 wt. % Co-2 wt. % Cu-1.2 wt. % P-0.06 wt. % B-1 wt. % C (Material "B") as control, the presintered products and the joined assemblies were prepared similarly in Example 1. Tests were carried out in accordance with the methods in Example 1 and the test results were obtained. The measured results of the dimension change ratios are shown by the curve "B" in FIG. 1, the results of the shearing strength are shown in FIGS. 3 and 4, and in Table 1.

TABLE 1

| Material | Sintering temperature (°C.) | Contraction ratio* (%) | Contraction amount** (mm) | Clearance α(mm) | Apparent interference*** (mm) | Apparent interference (%) | Joint strength (Kg/mm²) |
| --- | --- | --- | --- | --- | --- | --- | --- |
| A | 1110 | 6.1 | 1.7 | 0 | 1.7 | 6.1 | more than 15–28 |
| " | " | " | " | 0.3 | 1.4 | 5.0 | 15–28 |
| " | " | " | " | 0.6 | 1.1 | 3.9 | 14–26 |
| " | " | " | " | 0.8 | 0.9 | 3.2 | 10–22 |
| " | " | " | " | 1.0 | 0.7 | 2.5 | 2–15 |
| B | 1150 | 1.2 | 0.3 | 0 | 0.3 | 1.1 | 1 |

As seen in FIG. 1, the sintered alloy of the material "A" in Example 1 exhibited the maximum contraction ratio of about 6%, while the sintered alloy of the material "B" in control first expanded at around 1100° C. and then contracted at higher temperature. The maximum contraction ratio of the control was about 1.2%.

EXAMPLE 2

Using the same alloy as used in Example 1, the presintered products (inner diameter: 28.3 mm) as shown in FIGS. 5(a) and (b) were prepared. Then, after they were assembled onto a steel pipe shaft with 28 mm in outer diameter and sintered under the conditions that the maximum contraction ratio may be secured so as to produce a cam-cam shaft assembly for use in an engine as shown in FIG. 6.

The inner diameter of the product sintered under the same sintering conditions while not being assembled onto the steel pipe shaft was 26.6 mm, the contraction amount being 1.7 mm (=28.3−26.6) and the contraction ratio being 6.0% (=1.7/28.3×100). The apparent interference was 1.4 mm (=28.0−26.6) and the apparent interference ratio with respect to the outer diameter of the steel pipe shaft 5.0% (=1.4/28.0×100).

Figure 7:
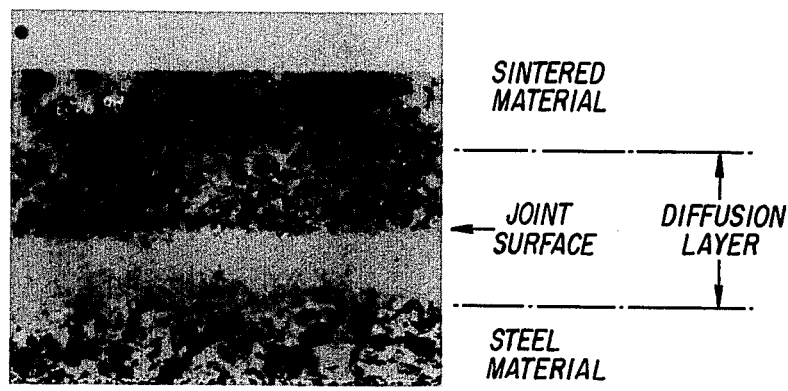
FIG. 7 is a micrograph showing a diffusion joint state of the cam-cam shaft assembly in Example 2.

As seen in the micrograph of FIG. 7, it was confirmed that the sintered mass was just metallurgically jointed to the steel pipe through diffusion joining layer. The shearing strength of the joined assembly was 17 kg/mm².

Summarizing the results obtained in Examples 1 and 2, FIG. 3 illustrates the relationship between the ratio of the apparent interference to the outer diameter of the member to which the component is jointed, taking the shearing strength as the joint strength of the joint assembly using the sintered alloy "A" with the clearances being varied.

Noting the minimum values of the joint strength, it is observed that the effect of heightening these values become large at the ratio of over 2%, conspicuous at the ratio of 3%, and stabilized at the ratio of over 4%.

FIG. 4 illustrates the relationship between the joint strength and the dimension contraction ratio of the alloy product sintered while being not assembled onto the shaft under the conditions that the clearances were set at less than about 1.0 mm for the purpose of assuring the excellent apparent interferences shown in FIG. 3.

Noting also the minimum values of the joint strength, the effect of enhancing the joint strength appears at the dimension contraction ratio of over 2%. The larger the contraction ratio of the alloy employed, of more than 3%, more than 4%, . . . , the wider is the selectivity of the setting ranges of the clearance to exhibit enough effect. In case the sintered alloy "A" which contracts at the ratio of 6.1%, a satisfactory effect is obtained even the clearance is 1.0 mm. In case the clearance is set at less than 0.6 mm, the effect becomes stable.

As understood from FIGS. 3 and 4, similar effect is obtained when the clearance is set at a negative value, that is, the presintered product is pressed-into to be joined to the shaft through sintering. The component to be assembled onto the shaft may be a molded powder product. It is preferable to employ a presintered product called also a preliminary sintered product or a primary sintered product to assure a certain strength from the standpoint of the workability. The sintering after assembling is called final sintering or a secondary sintering.

Figure 5:
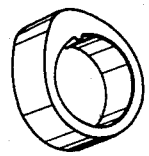
FIG. 5(a) and (b) are perspective views of a cam piece and a journal piece in Example 2 respectively.
Figure 5:
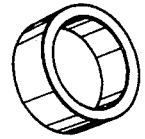
Figure 6:
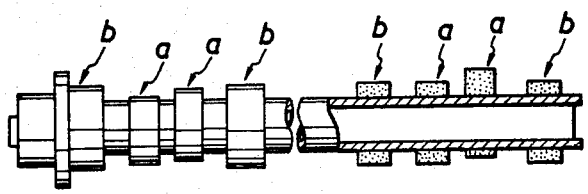
FIG. 6 is a partially broken front view of a cam-cam shaft assembly produced in Example 2 in which a sintered alloy component is joined to a metal shaft.

FIGS. 5 and 6 show an example of a cam-cam shaft assembly for use in an engine in which the components such as a cam piece and a journal made of the specific wear resistant sintered alloy are joined to a steel pipe according to the present invention. It was observed that the contraction ratio, apparent interference and joint strength of this assembly were in well conformity with those as to the test pieces in Example 1.

EXAMPLE 3

Similarly in Example 2, the cam-cam shaft assemblies were prepared using the different compositions, the results being shown in Table 2.

TABLE 2

| Component | Characteristic value of sintered mass | | Joint strength (Kg/mm²) | Wearing test | | Remarks |
|---|---|---|---|---|---|---|
| | Density g/cm³ | Apparent hardness Hv (10 kg) | | Cam wear-out amount (μ)* | Opponent rocker arm wear-out amount (μ)** | |
| Alloy No. 1 | 7.36 | 370 | 15-28 | 95 | 20 | 2.5Cr—0.10Mn—5Cu—0.5Si—0.7P—1.5C |
| Alloy No. 2 | 7.45 | 560 | 16-27 | 22 | 3 | 5.0Cr—1.0Mn—2Cu—1Si—0.5P—2.5C |
| Alloy No. 3 | 7.62 | 780 | 15-29 | 25 | 8 | 7.5Cr—3.0Mn—1Cu—2.0Si—0.2P—3.5C |
| Alloy No. 4 | 7.63 | 660 | 14-28 | 19 | 2 | Alloy No. 2 + 3Mo |

Note:
*Wear-out amount in the cam nose direction
**Maximum depth of wear-out portion in rocker arm pad In the foregoing, the present invention has been explained as to the sintered alloy having the composition described first at the beginning of "Detailed description of the invention", but the same or similar effects can be obtained by the use of the sintered alloy having the composition described second (next to the first one). The former sintered alloys correspond to U.S. patent application Ser. No. 213,239 and the latter to Japanese Patent Application Laid Open No. 2777/1977.

While prefered embodiments of the invention has been described using specific term, such description is for illustrative purpose only, and it is to be understood that changes and variations may be made without departing from the spirit or scope of the invention.

Having thus described the invention, what is claimed as novel and described to be secured by Letters Patent of the United States is:

1. A method for manufacturing a cam-cam shaft assembly, which comprises the steps of:
   (a) molding a component having a through-hole therein from an alloy material to be sintered, said material exhibiting a ratio of contraction of an inner diameter of said component at a joining portion when the component is sintered alone to said inner diameter thereof before sintering to be more than 2%;
   (b) presintering said component;
   (c) assembling said component onto a metal shaft such that said metal shaft is inserted into said through-hole; and
   (d) sintering said component assembled onto said metal shaft, whereby the joining of said component to said metal shaft is carried out in such a manner that the apparent interference is more than 2%.

2. A method for manufacturing a cam-cam shaft assembly claimed in claim 1 wherein said apparent interference is more than 3%.

3. A method for manufacturing a cam-cam shaft assembly claimed in claim 1 wherein said apparent interference is more than 4%.

4. A method for manufacturing a cam-cam shaft assembly claimed in claim 1, wherein the alloy comprises, in terms of weight, from 2.5 to 7.5% of Cr, from 0.1 to 3.0% of Mn, from 0.2 to 0.8% of P, from 1.0 to 5.0% of Cu, from 0.5 to 2.0% of Si, from 0 to 3.0% of Mo, from 1.5 to 3.5% of C, and the balance being Fe with less than 2.0% of impurities.

5. A method for manufacturing a cam-cam shaft assembly claimed in claim 3, wherein the alloy comprises, in terms of weight, from 4.5 to 6.5% of Cr, from 0.1 to 1.5% of Mn, from 0.35 to 0.65% of P, from 1.5 to 3.0% of Cu, from 0.7 to 1.5% of Si, from 0.5 to 1.5% of Mo, from 1.8 to 3.0% of C, and the balance being Fe with less than 2% of impurities.

6. A method for manufacturing a cam-cam shaft assembly claimed in claim 1 wherein the alloy comprises, in terms of weight, from 15 to 25% of Cr, from 0.3 to 0.8% of P, from 0 to 3.0% of Mo, from 2.0 to 4.0% of C, and the balance being Fe with less than 2% of impurities.

7. A method for manufacturing a cam-cam shaft assembly claimed in claim 2, wherein the alloy comprises, in terms of weight, from 2.5 to 7.5% of Cr, from 0.1 to 3.0% of Mn, from 0.2 to 0.8% of P, from 1.0 to 5.0% of Cu, from 0.5 to 2.0% of Si, from 0 to 3.0% of Mo, from 1.5 to 3.5% of C, and the balance being Fe with less than 2.0% of impurities.

8. A method for manufacturing a cam-cam shaft assembly claimed in claim 7, wherein the alloy comprises, in terms of weight, from 4.5 to 6.5% of Cr, from 0.1 to 1.5% of Mn, from 0.35 to 0.65% of P, from 1.5 to 3.0% of Cu, from 0.7 to 1.5% of Si, from 0.5 to 1.5% of Mo, from 1.8 to 3.0% of C, and the balance being Fe with less than 2% of impurities.

9. A method for manufacturing a cam-cam shaft assembly claimed in claim 2, wherein the alloy comprises, in terms of weight, from 15 to 25% of Cr, from 0.3 to 0.8% of P, from 0 to 3.0% of Mo, from 2.0 to 4.0% of C, and the balance being Fe with less than 2% of impurities.

10. A method for manufacturing a cam-cam shaft assembly claimed in claim 3, wherein the alloy comprises, in terms of weight, from 2.5 to 7.5% of Cr, from 0.1 to 3.0% of Mn, from 0.2 to 0.8% of P, from 1.0 to 5.0% of Cu, from 0.5 to 2.0% of Si, from 0 to 3.0% of Mo, from 1.5 to 3.5% of C, and the balance being Fe with less than 2.0% of impurities.

11. A method for manufacturing a cam-cam shaft assembly claimed in claim 10, wherein the alloy comprises, in terms of weight, from 4.5 to 6.5% of Cr, from 0.1 to 1.5% of Mn, from 0.35 to 0.65% of P, from 1.5 to 3.0% of Cu, from 0.7 to 1.5% of Si, from 0.5 to 1.5% of Mo, from 1.8 to 3.0% of C, and the balance being Fe with less than 2% of impurities.

12. A method for manufacturing a cam-cam shaft assembly claimed in claim 3, wherein the alloy comprises, in terms of weight, from 15 to 25% of Cr, from 0.3 to 0.8% of P, from 0 to 3.0% of Mo, from 2.0 to 4.0% of C, and the balance being Fe with less than 2% of impurities.

* * * * *